United States Patent Office 3,709,937
Patented Jan. 9, 1973

3,709,937
AMIDES OF HEXAHYDRO-4,7-METHANOINDAN-2-CARBOXYLIC ACID
Carl Peter Krimmel, Wauconda, Ill., assignor to G. D. Searle & Co., Chicago, Ill.
No Drawing. Original application July 17, 1967, Ser. No. 653,648, now Patent No. 3,547,976. Divided and this application July 23, 1970, Ser. No. 57,813
Int. Cl. C07c 103/86
U.S. Cl. 260—557 B          3 Claims

ABSTRACT OF THE DISCLOSURE

Dialkylaminoalkyl amides of hexahydro-4,7-methanoindan-2-carboxylic acid are described herein. They possess anti-bacterial, anti-protozoal, anti-fungal, and anti-algal activity. The compounds are prepared from the indan-2-carboxylic acid chloride.

The present application is a division of application Ser. No. 653,648, filed July 17, 1967, now U.S. Pat. 3,547,976.

The present invention relates to a group of derivatives of hexahydro-4,7-methanoindan-2-carboxylic acid. More particularly, it relates to a group of compounds having the following general formula

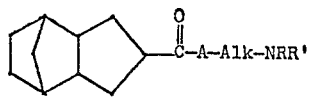

wherein A is selected from the group consisting of O, S, and NH; Alk is lower alkylene separating the atoms attached thereto by at least 2 carbon atoms; —NRR' is selected from the group consisting of di(lower alkyl)-amino and acyclic amino. Examples of cyclic amino radicals are 1-pyrrolidinyl, piperidino, morpholino, and 4-methyl-1-piperazinyl.

The lower alkylene radicals referred to above contain up to 6 carbon atoms and can be exemplified by ethylene, propylene, trimethylene, tetramethylene, pentamethylene, and hexamethylene. The lower alkyl radicals referred to above likewise contain up to 6 carbon atoms and can be exemplified by methyl, ethyl, propyl, isopropyl, butyl, and the like.

The organic bases of this invention form pharmaceutically acceptable salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, asorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of this invention are conveniently prepared by the reaction of an amine of the formula HA—Alk—NRR' wherein A, Alk, and —NRR' are defined as above, with a hexahydro-4,7-methanoindan-2-carboxylic acid halide. The acid chloride is preferred for this reaction and the reaction is carried out in an inert solvent. Benzene or a tertiary amine such as pyridine can be used as the solvent. In some instances, it may be necessary to apply external heat to the mixture in order for more complete reaction to take place.

The present esters can also be conveniently prepared by the reaction of the carboxylic acid with an appropriate dialkylaminoalkyl halide in a solvent such as 2-propanol.

The compounds of the present invention are useful because of their pharmacological properties. In particular, the present compounds possess anti-inflammatory activity. Thus, they have a phenylbutazone-like effect on edematoris conditions.

The present compounds also possess anti-biotic activity against a variety of organisms. Thus, they inhibit the growth of bacteria such as *Diplococcus pneumoniae*, protozoa such as *Tetrahymena gellelii*, fungi such as *Trichophyton mentagrophytes* and *Candida albicans*, and algae such as *Chlorella vulgaris*. The present compounds can thus be combined with various known excipients and adjuvants in the form of dusts, solutions, suspensions, ointments, and sprays to provide compositions useful for disinfecting purposes.

The following examples are presented to further illustrate the present invention; they should not be construed as limiting it in spirit or in scope. In these examples, quantities by weight are indicated in grams, quantities by volume are indicated in milliliters, and temperatures are indicated in degrees centigrade (° C.).

EXAMPLE 1

To a refluxing solution of 18.0 grams of hexahydro-4,7-methanoindan-2-carboxylic acid in 200 ml. of anhydrous 2-propanol, there is added, in one batch, 13.6 grams of 2-diethylaminoethyl chloride. The resultant mixture is refluxed for 5 hours and the solvent is removed by distilling the mixture on a steam bath under reduced pressure. The resulting residue is then made alkaline with dilute sodium hydroxide solution and extracted with anhydrous ethyl ether. The ether solution is then washed with water and dried over anhydrous sodium sulfate. The ether solvent is evaporated and the residue is distilled under reduced pressure to give a clear colorless oil boiling at about 149–156° C. at 0.3 mm. The product obtained in this way is 2 - diethylaminoethyl hexahydro-4,7-methanoindan-2-carboxylate and it has the following formula

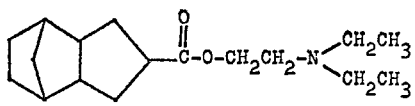

EXAMPLE 2

To a solution of 2.8 grams of 2-diethylaminoethyl hexahydro-4,7-methanoindan-2-carboxylate in 200 ml. of anhydrous ether, there is added 2.0 ml. of a 2-propanol solution containing 0.23 gram of anhydrous hydrogen chloride per milliliter. A thick white slurry forms and is separated by filtration and washed with anhydrous ethyl ether. This salt is then dried to give 2-diethylaminoethyl heahydro-4,7-methanoindan-2-carboxylate hydrochloride melting at about 132–140° C.

EXAMPLE 3

A mixture of 3.0 grams of 2-diethylaminoethyl hexahydro - 4,7 - methanoindan - 2 - carboxylate, 4.4 grams of ethyl bromide, and 30 ml. of 2-butanone is refluxed on a steam bath for 4 hours. The reaction mixture is then cooled and a crystalline precipitate forms. This is separated by filtration and washed with 2-butanone and then dried to give 2-diethylaminoethyl hexahydro-4,7-methanoindan-2-carboxylate ethobromide melting at about 184–187° C. The addition of 5 mg. of this compound to an agar plate inoculated with Candida albicans inhibits the growth of this organism.

EXAMPLE 4

3-dimethylaminopropyl chloride and 3-diethylaminopropyl chloride are each reacted with hexahydro-4,7-methanoindan-2-carboxylic acid according to the procedure described in Example 1 to give, respectively, 3-dimethylaminopropyl hexahydro - 4,7 - methanoindan-2-carboxylate and 3 - diethylaminopropyl hexahydro-4,7-methanoindan-2-carboxylate.

EXAMPLE 5

1 - (2 - chloroethyl)piperidine, 1 - (2 - chliroethyl)-pyrrolidine, 4 - (2 - chloroethyl)morpholine, and 1-(2-chloroethyl)-4-methylpiperazine are each reacted with hexahydro - 4,7 - methanoindan- 2 - carboxylic acid according to the procedure described in Example 1 to give, respectively, 2 - piperidinoethyl hexahydro - 4,7-methanoindan - 2 - carboxylate, 2 - (1 - pyrrolidinyl)-ethyl hexahydro - 4,7- - methanoindan - 2-carboxylate, 2 - morpholinoethyl hexahydro - 4,7 - methanoindan-2-carboxylate, and 2 - (4 - methyl - 1 - piperazinyl)ethyl hexahydro-4,7-methanoindan-2-carboxylate.

EXAMPLE 6

A mixture of 9.0 grams of hexahydro - 4,7-methanoindan-2-carboxylic acid and 30 ml. of thionyl chloride is refluxed on a steam bath for 2 hours. Unreacted thionyl chloride is removed from the mixture by distillation at reduced pressure and final traces of thionyl chloride are removed by adding azeotropically dried benzene and resuming vacuum distillation. The residue remaining after the removal of the benzene is hexahydro - 4,7 - methanoindan-2-carbonyl chloride and it is dissolved in 50 ml. of anhydrous benzene. To this solution there is added slowly, with stirring, a solution of 5.8 grams of 2-diethylaminoethylamine in 50 ml. of anhydrous benzene. A vigorous exothermic reaction ensues and the mixture is allowed to stand and cool to room temperature. The benzene is removed by distillation under reduced pressure and the resultant residue is dissolved in water. A cloudy solution results and this is treated with charcoal and filtered through diatomaceous earth and then washed with anhydrous ethyl ether. The clear aqueous solution is made alkaline with sodium hydroxide solution. An oil forms and is extracted with ether. The ether extract is then washed with water, treated with charcoal, and finally dried over anhydrous sodium sulfate. The ether is distilled off and the residue is distilled to give a pale yellow viscous oil boiling at about 171–183° C. at 0.3 mm. The product obtained in this way is N-(2-diethylaminoethyl)hexahydro-4,7-methanoindan-2-carboxamide and it has the following formula

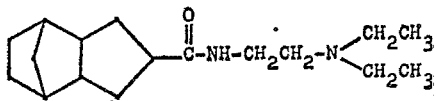

EXAMPLE 7

To a solution of 1.1 grams of N-(2-diethylaminoethyl)hexahydro-4,7-methanoindan - 2 - carboxamide in 100 ml. of anhydrous ethyl ether there is added, slowly and with stirring, a solution of 0.36 gram of anhydrous oxalic acid in 100 ml. of anhydrous ethyl ether. A gummy substance is formed. The liquid is then decanted from this material and fresh anhydrous ethyl ether is added. Stirring and scratching finally gives a brittle solid which is then allowed to stand overnight. The solid is powdered, separated by filtration, and washed with anhydrous ethyl ether. It is then dried in the air to give N-(2-diethylaminoethyl)hexahydro - 4,7 - methanoindan-2-carboxamide oxalate melting at about 79–87° C.

EXAMPLE 8

A mixture of 2.0 grams of N - (2 - diethylaminoethyl)-hexahydro - 4,7 - methanoindan - 2 - carboxamide, 3.1 grams of ethyl bromide, and 20 ml. of 2 - butanone is refluxed on a steam bath for 5 hours. The reaction mixture is then cooled and a white crystalline precipitate forms. This is separated by filtration and washed with 2-butanone. It is then dried in air to give N-(2-diethylaminoethyl)hexahydro - 4,7 - methanoindan - 2 - carboxamide ethobromide melting at about 180–183° C.

EXAMPLE 9

3-dimethylaminopropylamine is reacted with hexahydro - 4,7 - methanoindan - 2 - carbonyl chloride according to the procedure described in Example 6 to give N - (3 - dimethylaminopropyl)hexahydro - 4,7-methanoindan-2-carboxamide.

EXAMPLE 10

1 - (3 - aminopropyl)piperidine, 1 - (3 - aminopropyl)-pyrrolidine, 4 - (2 - aminoethyl)morpholine, and 1-(3-aminopropyl) - 4 - methylpiperazine are each reacted with hexahydro - 4,7 - methanoindan - 2 - carbonyl chloride according to the procedure described in Example 6 to give, respectively, N-(3-piperidinopropyl)hexahydro-4,7 - methanoindan - 2 - carboxamide, N-[3 - (1 - pyrrolidinyl)propyl]hexahydro - 4,7 - methanoindan - 2-carboxamide, N-(2 - morpholinoethyl)hexahydro - 4,7-methanoindan - 2 - carboxamide, and N-[3-(4-methyl-1-piperazinyl)propyl]hexahydro - 4,7 - methanoindan-2-carboxamide.

EXAMPLE 11

A mixture of 4.0 grams of hexahydro-4,7-methanoindan-2-carboxylic acid and 30 ml. of thionyl chloride is refluxed on a steam bath for 30 minutes. Excess unreacted thionyl chloride is removed by distillation at reduced pressure and final traces of thionyl chloride are removed by adding azeotropically dried benzene and resuming vacuum distillation. The residual hexahydro-4,7-methanoindan-2-carbonyl chloride is then dissolved in 25 ml. of anhydrous pyridine. A suspension of 4.0 grams of 2 - dimethylaminoethanethiol hydrochloride in 30 ml. of anhydrous pyridine is added to the acid chloride with stirring. The reaction mixture is then heated on a steam bath for 30 minutes and filtered hot. The product which is separated from the filtrate is S-(2-dimethylaminoethyl) hexahydro - 4,7-methanoindan-2-carboxylate hydrochloride.

What is claimed is:

1. A member selected from the group consisting of compound of the formula

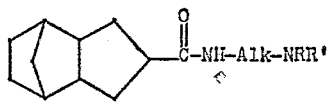

wherein Alk is lower alkylene separating the atoms attached thereto by at least two carbon atoms; and —NRR' is selected from the group consisting of di(lower alkyl)

amino, 1 - pyrrolidinyl, piperidino, morpholino, and 4-methyl - 1 - piperazinyl; and the pharmaceutically acceptable acid addition and alkyl halide quarternary ammonium salts thereof.

2. A compound according to claim 1 which is N-(2 - diethylaminoethyl)hexahydro - 4,7 - methanoindan-2-carboxamide.

3. A compound according to claim 1 which is N-(2-diethylaminoethyl)hexahydro - 4,7 - methanoindan-2-carboxamide ethobromide.

References Cited

UNITED STATES PATENTS 3,374,244  3/1968  Krimmel _____ 260—557

HENRY R. JILES, Primary Examiner

H. I. MONTZ, Assistant Examiner

U.S. Cl. X.R.

260—468 B; 424—248, 250, 267, 299, 320, 247.1, 501.15